(12) United States Patent
Lin et al.

(10) Patent No.: US 11,435,642 B2
(45) Date of Patent: Sep. 6, 2022

(54) SMART WINDOW AND METHOD FOR SWITCHING THE SAME

(71) Applicant: NATIONAL SUN YAT-SEN UNIVERSITY, Kaohsiung (TW)

(72) Inventors: Tsung-Hsien Lin, Kaohsiung (TW); Cheng-Chang Li, Kaohsiung (TW); Heng-Yi Tseng, Kaohsiung (TW); Hung-Chang Jau, Kaohsiung (TW); Li-Min Chang, Kaohsiung (TW); Kuan-Wu Lin, Kaohsiung (TW)

(73) Assignee: NATIONAL SUN YAT-SEN UNIVERSITY, Kaohsiung (TW)

(*) Notice: Subject to any disclaimer, the term of this patent is extended or adjusted under 35 U.S.C. 154(b) by 52 days.

(21) Appl. No.: 17/106,232

(22) Filed: Nov. 30, 2020

(65) Prior Publication Data
US 2022/0146873 A1 May 12, 2022

(30) Foreign Application Priority Data
Nov. 11, 2020 (TW) .................... 109139348

(51) Int. Cl.
*G02F 1/139* (2006.01)
*G02F 1/1343* (2006.01)

(52) U.S. Cl.
CPC ...... *G02F 1/1398* (2021.01); *G02F 1/134309* (2013.01); *G02F 2413/02* (2013.01)

(58) Field of Classification Search
CPC .. E06B 9/24; E06B 2009/2464; G02F 1/1398; G02F 1/134309; G02F 2413/02
See application file for complete search history.

(56) References Cited

U.S. PATENT DOCUMENTS

| | | | |
|---|---|---|---|
| 7,440,160 B2 | 10/2008 | Heckmeier et al. | |
| 2011/0129678 A1* | 6/2011 | He | C07D 311/92 544/111 |
| 2013/0021546 A1 | 1/2013 | Kikuchi et al. | |
| 2013/0050598 A1 | 2/2013 | Uehara | |
| 2019/0361284 A1* | 11/2019 | Yang | E06B 9/24 |
| 2022/0050316 A1* | 2/2022 | Hakemi | G02F 1/133305 |
| 2022/0066246 A1* | 3/2022 | Wu | G02F 1/1334 |

* cited by examiner

Primary Examiner — Mariam Qureshi
(74) Attorney, Agent, or Firm — WPAT, PC

(57) ABSTRACT

A smart window includes two transparent substrates and a liquid crystal layer. The two transparent substrates are opposite to each other and are electrically connected to a voltage supply. A first pulse voltage or a second pulse voltage is provided between the two transparent substrates by the voltage supply. The liquid crystal layer is located between the two transparent substrates and has a liquid crystal material. The liquid crystal material has a pitch of at most 250 nanometers or at least 500 nanometers. The liquid crystal material includes a nematic liquid crystal, a rotatory molecule, and a photochromic dye mixed with each other. The liquid crystal material changes a transmittance corresponding to a specific light wavelength range when receiving a light. The liquid crystal material is switched between a planar texture and a focal-conic texture respectively according to the first pulse voltage and the second pulse voltage.

14 Claims, 3 Drawing Sheets

SMART WINDOW AND METHOD FOR SWITCHING THE SAME

CROSS REFERENCE TO RELATED APPLICATION

The application claims the benefit of Taiwan application serial No. 109139348, filed on Nov. 11, 2020, and the entire contents of which are incorporated herein by reference.

BACKGROUND OF THE INVENTION

1. Field of the Invention

The present invention generally relates to an opto-electronic element and, more particularly, to a smart window and a method for switching the smart window between functions of light transmission, heat insulation, and privacy protection.

2. Description of the Related Art

Conventional smart windows are mainly categorized into two types, active and passive. Active smart windows use, for example, electrochromic technology or suspended particle device, to adjust the light transmittance thereby achieving the heat insulation effect. In addition, active smart windows use, for example, liquid crystal materials, to adjust the degree of light scattering thereby achieving the ground glass effect. Passive smart windows use, for example, thermochromic or photochromic technology, to adjust the light transmittance. Through a variety of light transmission control materials and technologies, conventional smart windows can only be switched between the light transmission state and the light absorption state, or between the light transmission state and the light scattering state.

However, due to the limitations of material compatibility and light transmission control technologies, the above-mentioned conventional smart windows can only be switched between the light absorption state and the light scattering state, resulting in limited functions of the conventional smart windows, therefore reducing interests of consumers.

Based on the above, it is necessary to improve the conventional smart windows.

SUMMARY OF THE INVENTION

To solve the problems mentioned above, an objective of the present invention is to provide a smart window and a method for switching the same, with the smart window being capable of switching between functions such as light transmission, heat insulation, and privacy protection, while achieving the effect of energy saving.

It is another objective of the present invention to provide a smart window and a method for switching the same, with the smart window hardly absorbing the visible light while not being irradiated by light and having dichroic absorption effect while being irradiated by light.

It is yet another objective of the present invention to provide a smart window and a method for switching the same, which can expedite the speed of switching states, thereby saving the time required by switching states.

It is still another objective of the present invention to provide a smart window and a method for switching the same, with the smart window having simplified structure so as to reduce the cost and technical difficulty of production.

As used herein, the term "a", "an", or "one" for describing the number of the elements and members of the present invention is used for convenience, provides the general meaning of the scope of the present invention, and should be interpreted to include one or at least one. Furthermore, unless explicitly indicated otherwise, the concept of a single component also includes the case of plural components.

A smart window according to an embodiment includes two transparent substrates and a liquid crystal layer. The two transparent substrates are opposite to each other and are electrically connected to a voltage supply. A first pulse voltage or a second pulse voltage is provided between the two transparent substrates by the voltage supply. The liquid crystal layer is located between the two transparent substrates and has a liquid crystal material. The liquid crystal material has a pitch of at most 250 nanometers or at least 500 nanometers. The liquid crystal material includes a nematic liquid crystal, a rotatory molecule, and a photochromic dye mixed with each other. The liquid crystal material changes a transmittance corresponding to a specific light wavelength range when receiving a light. The liquid crystal material is switched between a planar texture and a focal-conic texture respectively according to the first pulse voltage and the second pulse voltage.

Accordingly, the smart window according to an embodiment utilizes the liquid crystal material structure to be switched between the transparent state and the scattering state actively, thereby adjusting the degree of privacy protection. In addition, the smart window utilizes the photochromic dye to absorb the incident light in a specific light wavelength range, so that the smart window is in the absorption state. The light transmittance of the smart window is automatically adjusted by the intensity of the light illumination, which can achieve useful and appropriate effects of light shading and heat insulation. Further, the states after switching of the smart window can be stably maintained without continuous voltage supply, achieving the effect of energy saving. Thus, the smart window can achieve effects such as multi-functional switching, simplified structure, and easy switching control, based on user's need.

In an embodiment, the nematic liquid crystal is a positive nematic liquid crystal, and a voltage value of the first pulse voltage is greater than a voltage value of the second pulse voltage. As such, the sates of the smart window can be switched by adjusting the voltage value of the pulse voltage, ensuring the effect of easy switching control and increased operation methods.

In an embodiment, the nematic liquid crystal is a negative nematic liquid crystal, and the liquid crystal material further includes a salt ion, and a frequency value of the first pulse voltage is greater than a frequency value of the second pulse voltage. As such, the sates of the smart window can be switched by adjusting the frequency value of the pulse voltage, ensuring the effect of easy switching control and increased operation methods.

In an embodiment, when the liquid crystal material is in the planar texture, a transmittance corresponding to a visible light wavelength range of the smart window is higher than 80%. As such, the smart window has higher transmittance corresponding to visible light, ensuring the effect of improving transparency.

In an embodiment, a first time period required for the liquid crystal material to switch from the focal-conic texture to the planar texture is about 20 milliseconds. As such, the states of the smart window can be switched by transforming the liquid crystal structure, ensuring the effect of prompt switching control.

In an embodiment, a second time period required for the liquid crystal material to switch from the planar texture to the focal-conic texture is less than 300 milliseconds. As such, the states of the smart window can be switched by transforming the liquid crystal structure, ensuring the effect of prompt switching control.

In an embodiment, each of the two transparent substrates includes a transparent conductive film, respectively located on two opposite sides of the liquid crystal layer. As such, the transparent conductive film is electrically connected to the voltage supply, ensuring the effect of increasing conductivity.

In an embodiment, the specific light wavelength range includes at least one of a visible light wavelength range and an infrared light wavelength range. As such, the incident light in the specific light wavelength range is absorbed, ensuring the effect of light shading and heat insulation.

In an implementation of the example, the photochromic dye is ethyl 8-((4'-pentylcyclohexylphenyl)-difluoromethylphenyl-4-yl)-2-phenyl-2-(4-pyrrolidinylphenyl)-2H-naphtho [1,2-b] pyran-5-carboxylate. As such, dichroic absorption effect occurs after light illumination, ensuring the effect of improving heat insulation.

A method for switching a smart window according to an embodiment, which can be adapted to switch the smart window as mentioned above, includes steps of providing the first pulse voltage to switch the smart window from a scattering state to a transparent state; providing the second pulse voltage to switch the smart window from the transparent state to the scattering state; providing the light to switch the smart window from the transparent state to a transparent absorption state, in which when the light is not provided, the smart window switches to the transparent state; and provide the light to switch the smart window from the scattering state to a scattering absorption state, in which when the light is not provided, the smart window switches to the scattering state. When the first pulse voltage or the second pulse voltage is not provided, the smart window maintains stably in one of the transparent state, the scattering state, the transparent absorption state, and the scattering absorption state.

Accordingly, the method for switching a smart window according to an embodiment can adjust the degree of privacy protection by providing pulse voltage and adjust the light transmittance of the smart window by providing light illumination with various intensity. Thereby, the method for switching a smart window can appropriately generate effects of light shading and heat insulation. Further, the states of the smart window after switched by the method for switching a smart window can maintain stability without continuous voltage supply, achieving the effect of energy saving. Thus, the method for switching a smart window can achieve effects such as multi-functional switching, simplified structure, and easy switching control, based on user's need.

In an embodiment, the method for switching a smart window further includes steps of providing a third pulse voltage and the light to switch the smart window from the scattering absorption state to the transparent absorption state, in which when the light is not provided, the smart window switches to the transparent state; and providing a fourth pulse voltage and the light to switch the smart window from the transparent absorption state to the scattering absorption state, in which when the light is not provided, the smart window switches to the scattering state. As such, various operating parameters can be controlled based on user's need, ensuring the effect of increasing the operation range and the application methods.

In an embodiment, the nematic liquid crystal is a positive nematic liquid crystal, and a voltage value of the third pulse voltage is greater than a voltage value of the fourth pulse voltage. As such, the sates of the smart window can be switched by adjusting the voltage value of the pulse voltage, ensuring the effect of easy switching control and increased operation methods.

In an embodiment, the nematic liquid crystal is a negative nematic liquid crystal, and the liquid crystal material further incldues a salt ion, and a frequency value of the third pulse voltage is greater than a frequency value of the fourth pulse voltage. As such, the sates of the smart window can be switched by adjusting the frequency value of the pulse voltage, ensuring the effect of easy switching control and increased operation methods.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

Figure 1:
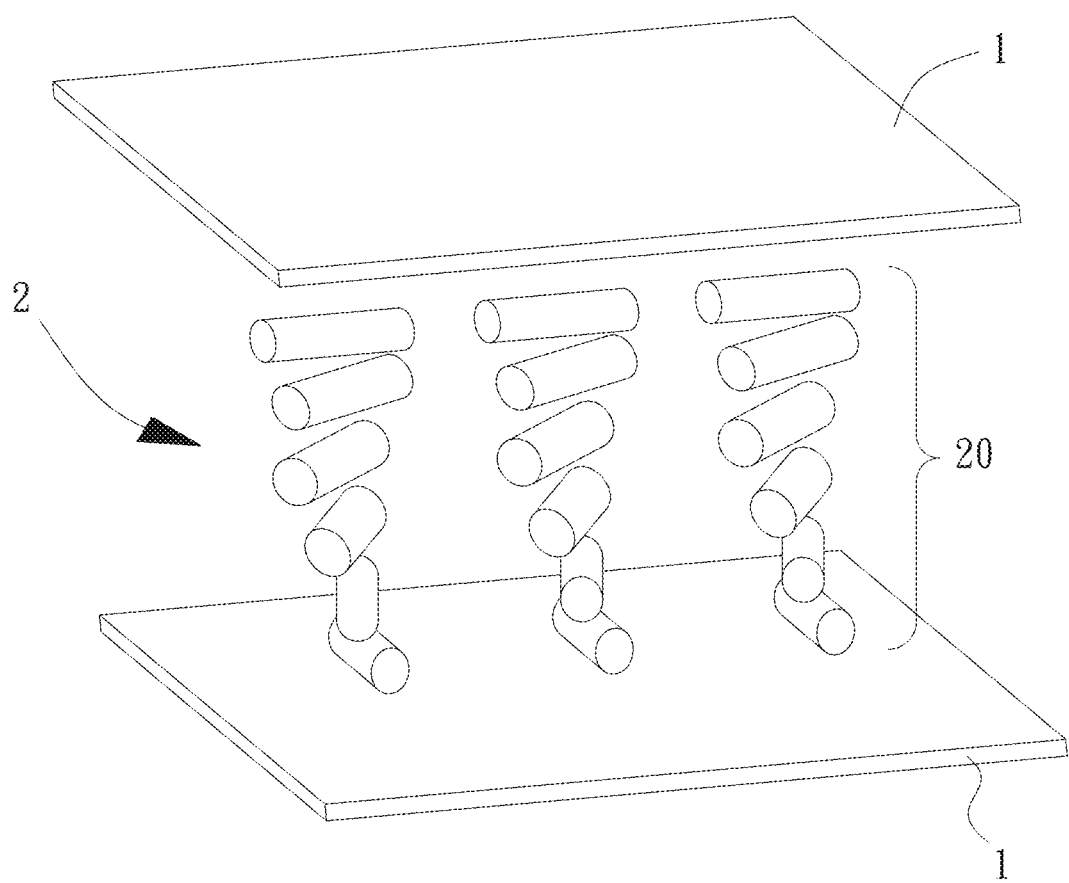
FIG. 1 is an exploded, perspective view according to a first embodiment of the present invention.

When the terms "front", "rear", "left", "right", "up", "down", "top", "bottom", "inner", "outer", "side", and similar terms are used herein, it should be understood that these terms have reference only to the structure shown in the drawings as it would appear to a person viewing the drawings and are utilized only to facilitate describing the invention, rather than restricting the invention.

DETAILED DESCRIPTION OF THE INVENTION

Figure 2:
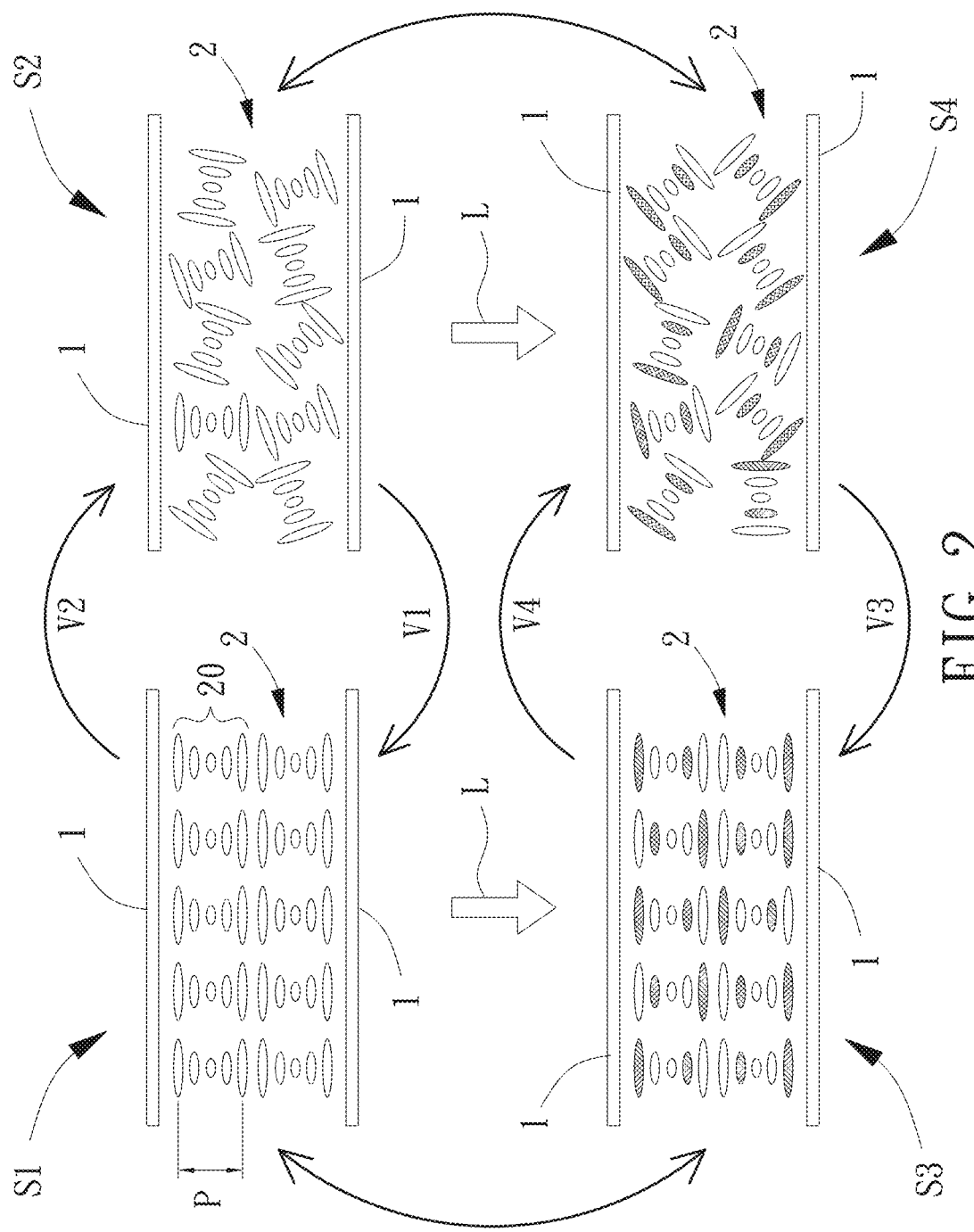
FIG. 2 is a switching diagram for each state according to the first embodiment of the present invention.

Referring to FIG. 1 and FIG. 2, a first embodiment of the smart window of the present invention includes two transparent substrates 1 and a liquid crystal layer 2. The liquid crystal layer 2 is sandwiched between the two transparent substrates 1.

The two transparent substrates 1 are separated from each other and arranged opposite to each other, preferably in parallel opposite arrangement. The two transparent substrates 1 are electrically connected to an external voltage supply (not shown) and receive a pulse voltage from the voltage supply. Therefore, when the voltage supply provides a pulse voltage to the two transparent substrates 1, an electric field of the pulse voltage is generated between the two transparent substrates 1, for adjusting the characteristics of the liquid crystal layer 2. For example, a first pulse voltage V1 or a second pulse voltage V2 with different voltage values or frequency values is provided between the two transparent substrates 1. The two transparent substrates 1 preferably include conductive, transmittable, and airtight materials. In some embodiments, each transparent substrate 1 includes a substrate and a transparent conductive film. For example, the substrate may be, but not limited to, glass, acrylic or plastics, such as PET and PC. The transparent conductive film may be, but not limited to, indium tin oxide, silver nanowire, or transparent conductive metal.

The liquid crystal layer 2 is located between the two transparent substrates 1. Preferably, the two transparent substrates 1 are directly disposed on the two opposite sides of the liquid crystal layer 2. The liquid crystal layer 2 has one or more liquid crystal materials 20. The liquid crystal material 20 includes a nematic liquid crystal, a rotatory molecule, and a photochromic dye mixed with each other. In some embodiments, the nematic liquid crystal is a positive nematic liquid crystal or a negative nematic liquid crystal. The nematic liquid crystal doped with the rotatory molecule is provided as cholesteric liquid crystal, which can transform to corresponding structures according to the appropriate voltage control. The liquid crystal material 20 has a pitch P. For example, the pitch P is at most 250 nanometers, or the pitch P is at least 500 nanometers.

Referring to FIG. 2, the liquid crystal material 20 is switched to a planar texture according to the first pulse voltage V1 provided between the two transparent substrates 1. As such, the spiral axis of each liquid crystal material 20 is uniformly perpendicular to the plane on which each transparent substrate 1 is located, making the liquid crystal material 20 in a periodic spiral structure. The periodic spiral structure, by the Bragg reflection characteristics, can reflect invisible light covering ultraviolet light wavelength (corresponding to the pitch P of at most 250 nanometers) and/or infrared light wavelength (corresponding to the pitch P of at least 500 nanometers), and allow visible light within visible light wavelength to penetrate. As such, the smart window has higher transmittance corresponding to the visible light to be in a transparent state S1, thereby achieving the functions of improving light transmission and providing an open view. Preferably, the transmittance corresponding to the visible light wavelength range of the smart window is higher than 80%.

The liquid crystal material 20 is switched to a focal-conic texture according to the second pulse voltage V2 provided between the two transparent substrates 1. As such, the spiral axis of each liquid crystal material 20 is randomly arranged. Therefore, the incident light is scattered to various directions, so that the image transmitted by the incident light cannot maintain as original. The smart window is thus in a scattering state S2 and has the function of generating blurred image and privacy protection. As mentioned above, the liquid crystal material 20 receives the first pulse voltage V1 or the second pulse voltage V2 to be switched to a planar texture or a focal-conic texture respectively, turning the smart window to the transparent state S1 or the scattering state S2.

In some embodiments, the photochromic dye is compatible with the nematic liquid crystal, and performs dichroic absorption characteristics when irradiated by a light L. The light L may be ultraviolet light, but the invention is not limited in this regard. Since the liquid crystal material 20 is a mixture of the nematic liquid crystal doped with the rotatory molecule and the photochromic dye, the liquid crystal material 20 receives the light L and changes the light transmittance corresponding to a specific light wavelength range by the photochromic dye. As such, the photochromic dye absorbs the incident light in the specific light wavelength range, making some energy of the incident light being absorbed. That is, the smart window is in the absorption state and has the functions of light shading and heat insulation. As the intensity of the light illumination increases, the absorption efficiency of the smart window will be automatically raised by the photochromic dye. Therefore, the smart window will not only turn to a darker appearance state, but also have a stronger dichroic absorption characteristic, achieving better optical effects compared with conventional smart windows. In addition, the smart window can be switched between the transparent state S1 and the scattering state S2 under different illumination levels (in absorption states). That is, the transparent window further has optical states such as a transparent absorption state S3 and a scattering absorption state S4.

According to the structure as mentioned above, the smart window according to an embodiment utilizes the liquid crystal material structure to be switched between the transparent state S1 and the scattering state S2 actively, thereby adjusting the degree of privacy protection. In addition, the smart window utilizes the photochromic dye to absorb the incident light in a specific light wavelength range, making the smart window is in the transparent absorption state S3 or the scattering absorption state S4. The light transmittance of the smart window is automatically adjusted by the intensity of the light illumination, which can achieve useful and appropriate effects of light shading and heat insulation. Further, the states after switching of the smart window can be stably maintained without continuous voltage supply, achieving the effect of energy saving. Thus, the smart window can achieve effects such as multi-functional switching, simplified structure, and easy switching control, based on user's need. In addition, the smart window needs no alignment film or polarizer disposed on either side of the transparent substrate 1, thereby simplifying the structure and reducing the cost and technical difficulty of the production process.

In some embodiments, the nematic liquid crystal is a positive liquid crystal. The liquid crystal material 20 includes the positive nematic liquid crystal, the rotatory molecule, and the photochromic dye. The liquid crystal material 20 receives a first pulse voltage V1 with a voltage value such as 70 volts to be switched to the planar texture, and a second pulse voltage V2 with a voltage value such as 52 volts to be switched to the focal-conic texture. The voltage value of the first pulse voltage V1 is greater than the voltage value of the second pulse voltage V2.

In some embodiments, the nematic liquid crystal is a negative liquid crystal. The liquid crystal material 20 further includes a salt ion. The liquid crystal material 20 can be switched between different structures according to different frequencies of the pulse voltages. The frequency value of the first pulse voltage V1 is greater than the frequency value of the second pulse voltage V2. The salt ion may be a material that decomposes positive and negative ions after dissolved in water or the nematic liquid crystal. For example, the salt ion includes, but not limited to, NaCl, $CaSO_4$, $Na_2CO_3$, $NaHCO_3$, $KNO_3$, Tetrabutylammonium bromide, Tetrabutylammonium hydrogensulfate, Tetrabutylammonium chloride, Tetrabutylammonium tetrafluoroborate and Tetrabutylammonium hexafluorophosphate, etc.

In some embodiments, the specific light wavelength range includes at least one of a visible light wavelength range and an infrared light wavelength range. After being irradiated by the light L, the liquid crystal material 20 reduces the light transmittance corresponding to visible light and infrared light, thereby absorbing more visible light and infrared light. For example, the photochromic dye includes, but not limit to, ethyl 8-((4'-pentylcyclohexylphenyl)-difluoromethylphenyl-4-yl)-2-phenyl-2-(4-pyrrolidinyl Phenyl)-2H-naphtho[1,2-b]pyran-5-carboxylate.

In the first embodiment, the transparent substrate 1 includes a glass material substrate and a tin oxide transparent conductive film. The liquid crystal layer 2 has a thickness of 12 microns, and the pitch P of the liquid crystal material 20 is 250 nanometers. The liquid crystal material 20 includes negative nematic liquid crystal DNM-9528 (93.744%), rotatory molecule R5011 (3.906%), salt ion TBATFB (0.350%) and photochromic dye (2.000%).

As the voltage supply provides a pulse voltage, the liquid crystal material 20 receives, for example, a first pulse voltage V1 with a frequency of 3000 Hz to be switched to the planar texture, and a second pulse voltage V2 with a frequency of 200 Hz to be switched to the focal-conic texture.

When the light L is not provided, the first time period required for the liquid crystal material 20 to be switched from the focal-conic texture (corresponding to the scattering state S2) to the planar texture (corresponding to the transparent state S1) is 16.8 milliseconds. When the light L is provided, the first time period becomes 23.6 milliseconds. Overall, the first time period required for the liquid crystal material 20 is about 20 milliseconds. When the light L is not provided, the second time period required for the liquid crystal material 20 to be switched from the planar texture (corresponding to the transparent state S1) to the focal-conic texture (corresponding to the scattering state S2) is about 292 milliseconds. When the light L is provided, the second time period is 277.2 milliseconds. Overall speaking, the second time period required by the liquid crystal material 20 is less than 300 milliseconds.

When being irradiated by the light L with an illuminance of 10 mW/cm$^2$, the smart window changes color to the transparent absorption state S3 or the scattering absorption state S4 in about 5.2 seconds. When the light L is not provided, the smart window recovers to the transparent state S1 or the scattering state S2 in about 54.2 seconds. The color change time and the recovery time are highly correlated with the illuminance. That is to say, the stronger the illuminance, the faster the color change time and the longer the recovery time. Therefore, the smart window will not only turn to a darker appearance state, but also has a stronger dichroic absorption characteristic.

Figure 3:
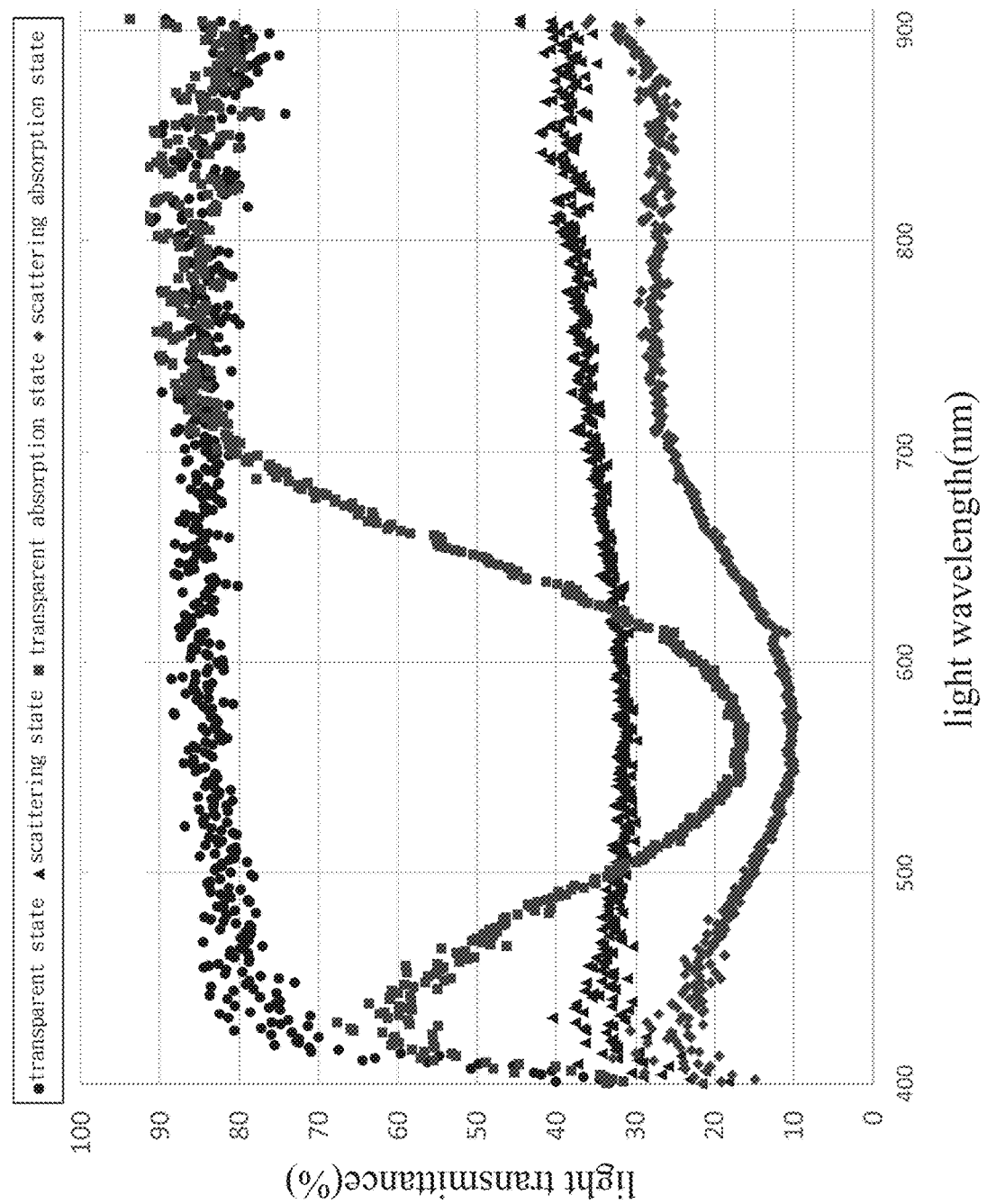
FIG. 3 is a relationship diagram between the light transmittance and the light wavelength of each state according to the first embodiment of the present invention.

Referring to FIG. 3, which shows a relationship diagram between the light transmittance and the light wavelength of each state according to the first embodiment of the present invention. The four curves shown in FIG. 3 correspond to the transparent state S1, the scattering state S2, the transparent absorption state S3, and the scattering absorption state S4 as shown in FIG. 2, respectively. In the transparent state S1, the light transmittance of the smart window is above 80%, which is higher compared to the conventional smart windows with the light transmittances of 50-65%. In the scattering state S2, the light transmittance of the smart window is below 35%, thereby generating scattering effect, whose haze is about 70%.

In the scattering state S2 with irradiation by the light L, the smart window will be switched to the black matte state, which is the scattering absorption state S4. As such, its light transmittance corresponding to the visible light wavelength range is further reduced to about 10%, whose haze is about 74.9%. In the scattering absorption state S4 without irradiation by the light L, the smart window will be switched to the transparent absorption state S3. As such, its light transmittance corresponding to the visible light wavelength range is about 20%.

Referring to FIG. 2 again, a method for switching a smart window according to an embodiment of the present invention can be adapted to switch the smart window as mentioned above. The structural features of the components, connection relationship between the components, effects, advantages, and derivative embodiments of the smart window are as described above. The method for switching the smart window includes the following steps. Firstly, provide the first pulse voltage V1 to make the smart window switch from a scattering state S2 to a transparent state S1, thereby achieving the functions of improving light transmission and providing an open view. Preferably, the transmittance corresponding to the visible light wavelength range of the smart window is higher than 80%.

Secondly, provide the second pulse voltage V2 to make the smart window switch from the transparent state S1 to the scattering state S2, thereby achieving the functions of blurred vision and privacy protection. The operating mechanisms of the smart window utilizing the liquid crystal material 20 to receive the first pulse voltage V1 or the second pulse voltage V2 to be switched to the transparent state S1 or the scattering state S2, respectively, and derivative embodiments thereof are as described above.

Then, provide the light L to make the smart window switch from the transparent state S1 to the transparent absorption state S3, and when the light L is not provided, the smart window switches to the transparent state S1. And, provide the light L to make the smart window switch from the scattering state S2 to the scattering absorbing state S4, and when the light L is not provided, the smart window switches to the scattering state S2. When the first pulse voltage V1 or the second pulse voltage V2 is not provided, the smart window maintains stably in one of the transparent state S1, the scattering state S2, the transparent absorption state S3, and the scattering absorption state S4, thereby achieving the effect of energy saving. The operating mechanisms of the smart window utilizing the photochromic dye for receiving the light L and absorbing the incident light having the specific light wavelength range, while being switched to the transparent absorption state S3 or the scattering absorption state S4, respectively, are as described above. Also, the derivative embodiments thereof are as described above.

According to the steps as set forth above, the method for switching a smart window according to an embodiment of the present invention can adjust the degree of privacy protection by providing pulse voltage and adjust the light transmittance of the smart window by providing light illumination with various intensity. Thereby, the method for switching a smart window can appropriately generate effects of light shading and heat insulation. Further, the states of the smart window after switched by the method for switching a smart window can be stably maintained without continuous voltage supply, achieving the effect of energy saving. Thus, the method for switching a smart window can achieve effects such as multi-functional switching, simplified structure, and easy switching control, based on user's need.

In some embodiments, when the nematic liquid crystal is a positive liquid crystal, the voltage value of the first pulse voltage V1 is greater than the voltage value of the second pulse voltage V2. In some embodiments, when the nematic liquid crystal is a negative liquid crystal and the liquid crystal material 20 further includes a salt ion, the frequency value of the first pulse voltage V1 is greater than the frequency value of the second pulse voltage V2. Those relevant technical features and effects are as mentioned above.

Referring to FIG. 2 again, the method for switching a smart window according to an embodiment of the present invention further includes the steps of providing a third pulse voltage V3 and the light L to make the smart window switch from the scattering absorption state S4 to the transparent absorption state S3, in which when the light L is not provided, the smart window switches to the transparent state S1; and providing a fourth pulse voltage V4 and the light L to make the smart window switch from the transparent absorption state S3 to the scattering absorption state S4, in which when the light L is not provided, the smart window switches to the scattering state S2.

Since some characteristics of the liquid crystal material 20 of the smart window will change after being irradiated by the light L, the values of the first pulse voltage V1 and the third pulse voltage V3 may not be exactly the same. In some embodiments, when the nematic liquid crystal is a positive liquid crystal, the voltage value of the third pulse voltage V3 is greater than the voltage value of the fourth pulse voltage V4. In some embodiments, when the nematic liquid crystal is a negative liquid crystal and the liquid crystal material 20 further includes a salt ion, the frequency value of the third pulse voltage V3 is greater than the frequency value of the fourth pulse voltage V4. Those relevant technical features and effects are as mentioned above.

Based on the above, the smart window and the method for switching the same utilize the liquid crystal material structure to be switched between the transparent state and the scattering state actively, thereby adjusting the degree of privacy protection. In addition, the smart window utilizes the photochromic dye to absorb the incident light in a specific light wavelength range, so that the smart window is in the absorption state. The light transmittance of the smart window is automatically adjusted by the intensity of the light illumination, which can achieve useful and appropriate effects of light shading and heat insulation. Further, the states after switching of the smart window can be stably maintained without continuous voltage supply, achieving the effect of energy saving. Thus, the smart window can achieve effects such as multi-functional switching, simplified structure, and easy switching control, based on user's need. Meanwhile, through the photochromic dye, the smart window will not only turn to a darker appearance state, but also has a stronger dichroic absorption characteristic, achieving better optical effects compared with the conventional smart windows. In addition, the smart window needs no alignment film or polarizer disposed on either side of the transparent substrate, thereby simplifying the structure and reducing the cost and technical difficulty of the production process.

Although the invention has been described in detail with reference to its presently preferable embodiments, it will be understood by one of ordinary skill in the art that various modifications can be made without departing from the spirit and the scope of the invention, as set forth in the appended claims.

What is claimed is:

1. A smart window comprising:
two transparent substrates opposite to each other and are electrically connected to a voltage supply, wherein one of a first pulse voltage a second pulse voltage, a third pulse voltage, and a fourth pulse voltage is provided between the two transparent substrates by the voltage supply; and
a liquid crystal layer located between the two transparent substrates and having a liquid crystal material with a pitch of at most 250 nanometers or at least 500 nanometers, wherein the liquid crystal material includes a nematic liquid crystal, a rotatory molecule, and a photochromic dye mixed with each other, wherein the liquid crystal material is configured for changing a transmittance corresponding to a specific light wavelength range when receiving a light, and configured for being switched between a planar texture and a focal-conic texture respectively according to the first pulse voltage and the second pulse voltage;
wherein the smart window is switched from a scattering state to a transparent state when the first pulse voltage is provided;
wherein the smart window is switched from the transparent state to the scattering state when the second pulse voltage is provided;
wherein in the state that the smart window is in the transparent state, the smart window is switched from the transparent state to a transparent absorption state when the light is provided; and then the smart window is switched from the transparent absorption state to the transparent state when the light is not provided;
wherein in the state that the smart window is in the scattering state, the smart window is switched to from the scattering state to a scattering absorption state when the light is provided; and then the smart window is switched from the scattering absorption state to the scattering state when the light is not provided;
wherein the smart window maintains stably in one of the transparent state, the scattering state, the transparent absorption state, and the scattering absorption state when the first pulse voltage or the second pulse voltage is not provided;
wherein the smart window is switched from the scattering absorption state to the transparent absorption state when the third pulse voltage and the light are provided; and then the smart window is switched to the transparent state when the light is not provided; and
wherein the smart window is switched from the transparent absorption state to the scattering absorption state when the fourth pulse voltage and the light are provided; and then the smart window is switched to the scattering state when the light is not provided.

2. The smart window as claimed in claim 1, wherein the nematic liquid crystal is a positive nematic liquid crystal, and a voltage value of the first pulse voltage is greater than a voltage value of the second pulse voltage.

3. The smart window as claimed in claim 1, wherein the nematic liquid crystal is a negative nematic liquid crystal, and the liquid crystal material further includes a salt ion, and a frequency value of the first pulse voltage is greater than a frequency value of the second pulse voltage.

4. The smart window as claimed in claim 1, wherein when the liquid crystal material is in the planar texture, a transmittance corresponding to a visible light wavelength range of the smart window is higher than 80%.

5. The smart window as claimed in claim 1, wherein a first time period required for the liquid crystal material to be switched from the focal-conic texture to the planar texture is about 20 milliseconds.

6. The smart window as claimed in claim 1, wherein a second time period required for the liquid crystal material to be switched from the planar texture to the focal-conic texture is less than 300 milliseconds.

7. The smart window as claimed in claim 1, wherein each of the two transparent substrates includes a transparent conductive film, respectively located on two opposite sides of the liquid crystal layer.

8. The smart window as claimed in claim 1, wherein the specific light wavelength range includes at least one of a visible light wavelength range and an infrared light wavelength range.

9. The smart window as claimed in claim 1, wherein the photochromic dye is ethyl 8-((4'-pentylcyclohexylphenyl)- difluoromethylphenyl-4-yl)-2-phenyl-2-(4-pyrrolidinylphenyl)-2H-naphtho [1,2-b] pyran-5-carboxylate.

10. A method for switching a smart window, wherein the smart window comprises two transparent substrates and a liquid crystal layer between the two transparent substrate, the two transparent substrates are opposite to each other and electrically connected to a voltage supply, and the voltage supply provides one of a first pulse voltage, a second pulse voltage, a third pulse voltage, and a fourth pulse voltage, the method comprises:
- providing the first pulse voltage to switch the smart window from a scattering state to a transparent state;
- providing the second pulse voltage to switch the smart window from the transparent state to the scattering state;
- providing the light to switch the smart window from the transparent state to a transparent absorption state, wherein when the light is not provided, the smart window is switched to the transparent state;
- providing the light to switch the smart window from the scattering state to a scattering absorption state, wherein when the light is not provided, the smart window is switched to the scattering state;
- providing the third pulse voltage and the light to switch the smart window from the scattering absorption state to the transparent absorption state, wherein when the light is not provided, the smart window is switched to the transparent state; and
- providing the fourth pulse voltage and the light to switch the smart window from the transparent absorption state to the scattering absorption state, wherein when the light is not provided, the smart window is switched to the scattering state;
- wherein when the first pulse voltage or the second pulse voltage is not provided, the smart window maintains stably in one of the transparent state, the scattering state, the transparent absorption state, and the scattering absorption state.

11. The method as claimed in claim 10, wherein the nematic liquid crystal is a positive nematic liquid crystal, and a voltage value of the third pulse voltage is greater than a voltage value of the fourth pulse voltage.

12. The method as claimed in claim 10, wherein the nematic liquid crystal is a negative nematic liquid crystal, and the liquid crystal material further includes a salt ion, and a frequency value of the third pulse voltage is greater than a frequency value of the fourth pulse voltage.

13. The method as claimed in claim 10, wherein the nematic liquid crystal is a positive nematic liquid crystal, and a voltage value of the first pulse voltage is greater than a voltage value of the second pulse voltage.

14. The method as claimed in claim 10, wherein the nematic liquid crystal is a negative nematic liquid crystal, and the liquid crystal material further includes a salt ion, and a frequency value of the first pulse voltage is greater than a frequency value of the second pulse voltage.

* * * * *